(12) United States Patent
Johnstone

(10) Patent No.: US 6,168,840 B1
(45) Date of Patent: Jan. 2, 2001

(54) STRETCHED PLASTIC FILM FOR AGRICULTURAL USE

(75) Inventor: Peter Johnstone, Reservoir (AU)

(73) Assignee: First Green Park PTY LTD, Reservoir (AU)

(*) Notice: Under 35 U.S.C. 154(b), the term of this patent shall be extended for 0 days.

(21) Appl. No.: 09/171,840

(22) PCT Filed: May 1, 1997

(86) PCT No.: PCT/AU97/00263

§ 371 Date: Nov. 12, 1998

§ 102(e) Date: Nov. 12, 1998

(87) PCT Pub. No.: WO97/41721

PCT Pub. Date: Nov. 13, 1997

(30) Foreign Application Priority Data

May 3, 1996 (AU) .................................................. PN 9673

(51) Int. Cl.$^7$ .................................................. B29D 22/00

(52) U.S. Cl. .................................... 428/36.91; 428/36.92; 428/910; 428/156; 428/121; 428/188; 47/26; 47/28.1; 264/177.17; 264/210.7; 264/211.12; 264/288.4; 264/294

(58) Field of Search .................. 47/26, 28.1; 428/36.92, 428/36.91, 910, 156, 121, 188; 264/177.17, 210.7, 211.12, 288.4, 294, 235.8, 171.28; 524/543

(56) References Cited

U.S. PATENT DOCUMENTS

| 3,559,599 | * | 2/1971 | Hoadley ................................ | 111/200 |
| 4,337,181 |   | 6/1982 | Otey et al. ............................ | 523/128 |
| 4,817,673 | * | 4/1989 | Zoghby et al. ....................... | 138/174 |
| 5,118,725 | * | 6/1992 | Suominen ............................ | 523/122 |
| 5,458,841 | * | 10/1995 | Shirrell ................................ | 264/230 |
| 5,531,393 | * | 7/1996 | Salzsauler et al. ............... | 242/160.4 |

FOREIGN PATENT DOCUMENTS

| 81968/75 | 10/1977 | (AU) . |
| 75896/87 | 7/1988 | (AU) . |
| 19501/92 | 3/1993 | (AU) . |
| 230143 | 7/1987 | (EP) . |
| 2464-024 | 4/1981 | (FR) . |
| 2620592 | 3/1989 | (FR) . |
| 89/06594 | 7/1989 | (WO) . |

* cited by examiner

Primary Examiner—Robert Dawson
Assistant Examiner—Kuo-Liang Peng
(74) Attorney, Agent, or Firm—Alston & Bird LLP

(57) ABSTRACT

There is disclosed the provision of a plastic film for covering soil for use in cropping or covering a frame for greenhouse effect. At least part of the plastic film has been stretched beyond its yield point prior to application. In alternative forms, the film undergoes a secondary stretch to form a predetermined pattern of weakness in certain localized areas of the film. The film may be photodegradable and biologically degradable to accelerate decomposition of the film when exposed to the elements.

40 Claims, 4 Drawing Sheets

STRETCHED PLASTIC FILM FOR AGRICULTURAL USE

The present invention relates to improvements relating to plant propagation techniques and specifically to means for encouraging the germination of plant seeds in cool climates.

In temperate climate zones, particularly in Europe, the British Isles, North America, Southern Australia and New Zealand germination of seeds is often delayed until the soil temperature has increased above its given minimum temperature determined by the nature of the seed and that the likelihood of frost has diminished. Furthermore it is desirable to improve moisture retention in the soil particularly in dry climates that occur in areas of Africa, Australia and the United States.

The present invention has reference to the propagation of a wide variety of plant seeds, however, specific description will be made with reference to the growing of maize corn crops, which represent a large proportion of cropping in temperate zones during the summer season.

Maize corn has a relatively long growing season of approximately 5 months before full maturity of the crop is reached.

This means that the seeds must be sown as soon as possible in the growing season to ensure maximum production of corn.

In many cool temperate zones, particularly in Europe, the growing season is relatively short and maybe shorter than that required to achieve full maturity of the corn harvest.

If the harvest does not reach full maturity this results in a reduced volume harvest and in some instances lower quality produce.

The present invention is primarily concerned with achieving earlier germination of seeds in a given growing season coupled with improving moisture retention in the soil during the growing phase of the crop.

Conventional methods of achieving this concern the use of thin plastic film layered on the cultivated soil, the soil having already been seeded or being seeded concurrently with the cultivation of the soil, or seeded at a later date through the plastic already laid after the plastic has had an opportunity to assist in the warming of the soil. Other methods include so called cloche cover film involving the use of film forming a tunnel like cover to protect growing plants.

In addition the film can be used in conventional greenhouse like structures or as a mulch film. In these instances the selective use of ultra violet ray stabilisation is desirable depending upon the purpose of the film and the desirability or not of quick break down of the film during the crop growth period.

For example in greenhouse use and mulch film use it is desirable that the file does not break down for the whole growing season, for example, in the cropping of strawberries or melon.

With conventional plastic cover techniques it is possible to cultivate the soil and apply the plastic film simultaneously with existing machinery. Such techniques allow the earlier germination of seeds and provide protection for the seedlings from late season frosts, but which will not impede growth of the seedlings beyond the initial germination stages.

The film maybe made from non-ultraviolet or ultraviolet resistant plastic and is extruded to a minimum thickness of between 10 to 15 microns. Cloche films maybe 10 to 25 microns and mulch films are conventionally 20 to 50 microns.

The use of UV resistant film is dictated to a certain extent by the use to which the film is to be put as mentioned previously. For example, to achieve fast degradation it may be necessary to use photodegradable and/or biodegradable additives.

Where it is desirable for quick degradation the use of relatively thick film does exhibit some practical problems in being slow to breakdown after germination of the seeds and furthermore, it has been shown that there is some difficulty in handling the film efficiently with machinery; finally use of the plastic at relatively high thicknesses is not always economically sensible.

With existing film extrusion machinery, it is not possible in practical procedures to extrude film having a thickness of less than about 8 microns.

The present invention has as its objective to provide a film for use in the covering of soil or greenhouse structures containing plant seeds or destined to contain seeds wherein, at least, some of the above mentioned problems are overcome.

According to the present invention there is provided a plastic film for covering seeded soil or soil destined to contain seeds for propagation, characterised in that the film is stretched at at least localised regions along a length of said film to beyond the yield point of the film to achieve a reduced thickness in said stretched region or regions whereby in use the film will deteriorate to allow passage of a germinated seedling therethrough.

In one preferred aspect the film may be completely stretched beyond its yield point. Alternatively the film may be stretched beyond its yield point along one or more lines along the length of the film. Conveniently, the film may be stretched beyond its yield point in a predetermined pattern of said localised regions along a length of said film. In another arrangement, the film may be completely stretched beyond its yield point and is thereafter further stretched along one or more lines along the length of the film. In a still further possible arrangement, the film may be completely stretched beyond its yield point and is thereafter further stretched in a predetermined pattern of said localised regions along a length of said film.

The film is preferably stretched at its point of extrusion, that is, in line stretching of the film during the extrusion process.

The film may be stretched at a secondary out of line stretching process. Alternatively the film may be stretched at the point of application of the film to the soil and this latter method will be described in greater detail in the practical arrangement. Stretching at the point of extrusion (in-line stretching) and/or stretching during a secondary process before working in the field will be the preferred option to reduce the likelihood of damage to the film at the point of laying the film onto a crop bed.

In a further aspect of the invention, there is provided a film for use in the covering of soil containing plant seeds or destined to contain plant seeds to be germinated in which a non-ultraviolet resistant (photodegradable) biologically degradable film web has undergone stretching beyond its yield point whereby the thickness of the film is reduced to a thickness of 10 microns or less such that at least part of the web will more quickly deteriorate through weathering and or biological activity and thereby allow passage of a germinated seedling from beneath the protective cover of the film which has acted to facilitate heating of the soil and protection from frosts during the seed germination process and/or preceding period.

Optionally the film may be untreated, photodegradable, biologically degradable or a combination of the above. In some instances as mentioned previously the film should be photodegradable to allow acceleration of UV degradation and allows the germinated crop to emerge after the initial growing stage after a relatively short time span of say one month. Opaque film may be used to restrict passage of light to the area of soil surrounding a plant. Additional localised stretching of the film renders the film transparent in local sections near the plant to allow light to pass through.

The stretching of the film is achieved by a plastic film stretching machine and such machines are well known in this field.

In one aspect of the invention, edges of the film may be folded or of greater thickness than the mid portion of the film to enable more efficient machine handling and anchoring of the film during laying thereof onto the ground and covering of the film at least on the edge portions by soil.

The film is preferably pre-stretched prior to the application of the film onto the ground and the film may be stored in its stretched condition on rolls ready for use. Additional stretching of the film by the formation of spaced dimples along the length of the film may be provided with the dimples providing space for the germinated seedling to grow. Futhermore, the dimples generate weakened portions in the film which will quickly degrade upon exposure to ultraviolet light. Alternatively the web may have a continuous line of additional stretching along the length of the film above the seedling to allow the plant to grow thought the weakened layer.

This is seen as being advantageous over conventional methods of simple cutting of the film at spaced intervals or along its entire length which is a costly and labour intensive procedure. Also it may create a problem wherein the film tends to coil if it is split along its entire length.

It has been found that the stretched degradable film will quickly degrade upon exposure to ultraviolet light, with the degradation occurring in a more or less uniform manner, however, some areas of the film will be unexposed in the shelter of the growing plant or covering soil and degradation will be slower in these areas.

The speed of degradation can be easily controlled by the addition of suitable chemicals to the plastic film as well as the control of thickness of the film. In drier climates it may be preferable for the film to remain intact (not degrade) around the base of the plant to assist in moisture retention, during the growing season.

The major advantage of the present invention is that there is at least 50% more film available for a given volume of non stretched plastic, where the plastic has been stretched to say 100% elongation and then allowed to relax.

In very cold climates, two layers of film or laminated film may be provided for better heat retention. Such film may be manufactured as a tube with an air layer being trapped between the layers of the film during the laying process and can be utilised in a similar manner to that previously described. This is particularly useful in frost prone areas. Such dual layer film is particularly suitable for use in ground cover or glasshouse structure covering.

The plastic is natural, biologically degradable, or photodegradable or a combination thereof and furthermore is preferably not stabilised against ultraviolet rays thereby ensuring rapid deterioration to the film on or under the seed bed after exposure to the elements, particularly it is to be used as ground cover. Biologically degradable film will be degraded even if buried beneath the soil.

It has been found that the degradable web made in accordance with present invention (particularly in the thinner or weakened portions) will deteriorate after a relatively short period time of 4 to 10 weeks which represents the germination time for the seed being propagated depending upon addition of degrading additives and the thickness of the film. Alternatively the film my be apertured or dimpled at spaced intervals to allow passage of the germinated seedling through the film. The spacing of the apertures or dimples depends upon plant type being grown.

Thus, the easy passage of the germinated seedling through the plastic covering is ensured, preferably, the plastic film quickly degrades during the growing of the crop such that it has at least partially decomposed at the time of harvest which may be some 5 or 6 months later.

The use of plastic film to cover the seed bed at the commencement of the season has been found to extend the growing season for up to two months, allowing for a larger harvest of up to 6 tonnes per hectare of maize corn on a dry matter base, resulting in or ensuring an economic return on the cost of preparation of the seed bed. Preliminary trials with other crops such as sugarbeet suggest higher yields and higher sugar content.

For cover film the film may be untreated or photodegradable or biodegradable or a combination of both photo and biodegradable. So that in the case of a combination photo and biodegradable film the plant is allowed passage through the film after germination due to quick breakdown of the film whilst the biodegradable additive would allow breakdown of any buried plastic after harvesting of the crop. This then avoids any possibility of soil contamination from prolonged use of plastic film on the same soil area. In applications where a major portion of the plastic film does not degrade over a growing season, the film would be removed at the end of each growing season. However, even in such circumstances the amount of waste plastic is significantly reduced when compared to conventional methods because of lower volumes of plastic being utilised over each soil area being used.

In one example of the invention, it has been found that pre-stretching of the film web of standard width past the yield point will result in a reduction in film thickness to no more than 10 microns. In this example the starting thickness of the film web was 17 microns. It is possible to use the double layer with an air gap in between to achieve greater insulation qualities. With a double layer it is preferable to have a maximum film thickness of approximately 8 microns per layer to reduce cost.

Thus, the manufacture of the film is a relatively simple procedure in the sense that the extrusion process takes place with medium film thicknesses and yet a web thickness of at least 4 microns can be achieved after stretching, without any adverse effect upon the handling capabilities of the film. In fact it has been found that the stretched film, even though very thin, has enhanced handling characteristics.

The stretched film has a greater strength for a given thickness than unstretched film.

In accordance with further aspect of the present invention, there is provided a method of covering a soil area destined to grow seedlings or cropping plants germinated in the soil area said method including stretching a plastics material film completely across its transverse width in a longitudinal direction of the film to beyond its yield point whereby the film length is increased and the film thickness is decreased, said stretched film thereafter being laid over said soil area. Preferably the stretching of said film reduces the film thickness to no more than 10 microns.

In accordance with a still further aspect of the present invention, there is provided a method of growing seedlings or cropping plants germinated in a soil area, said method being characterised in that a plastics material film is stretched at at least localised regions along a length of said film to beyond the yield point of said film to achieve a reduced thickness in said stretched region or regions of said film whereby in use the film will deteriorate to allow passage of a germinated seedling or plant through said stretched region or regions, and said stretched film thereafter being laid over said soil area.

Practical preferred arrangements of the present invention will now be described with reference to the accompanying drawings showing a preferred stretching mechanism, which may be mounted in a film extrusion line, or as a secondary line downstream from the extrusion line.

BRIEF DESCRIPTION OF DRAWINGS

With reference to FIG. 1 illustrating one practical arrangement, film is introduced to the stretching machine 10 which comprises a low speed stretch roller 11 mechanically connected to a high speed stretch roller 12, with the high speed stretch roller contacting the film as it is removed from the film roll 15 to elongate the film in the gap 16 between the film roll and the high speed stretch roller 12. The stretching will significantly increase the area of film available for use in covering the soil. The stretching maybe in either or a combination of both planes of the film length wise and width wise. The elongation maybe up to the order of 300% stretch. The film can then be dispensed through exit rollers 13 and 14 directly onto the cultivated soil 17.

The stretching of the film maybe achieved by a number of different methods without departing from the concept of the invention. For example, direct braking of the film roll or a motor drive high speed stretching roller (not shown) which are well known in the art.

The invention results in a more efficient use of the film in as much as approximately double the length of standard lengths of unstretched film is available for use for similar volume costs of plastic.

In a further example of the invention the film may be extruded as a dual ply film, or alternatively extruded in two plies to then form a dual ply film, with trapped air therebetween such that film is then stretched beyond its yield point. The two layers of film maybe sealed at the edges by covering with soil thus serving the dual purpose of trapping air between the plies and securing the sheet to the ground. This film exhibits even better insulating qualities, and may be used for a longer period as a preheating film prior to the sowing of seed in the covered cultivated beds.

It would be appreciated that the film may have a width to accommodate more than one row of cultivar.

It is preferable, (to avoid damage to the film at the work site) for stretching of the film to occur at the time of extrusion of the film or prior to laying out of the film.

Figure 2:
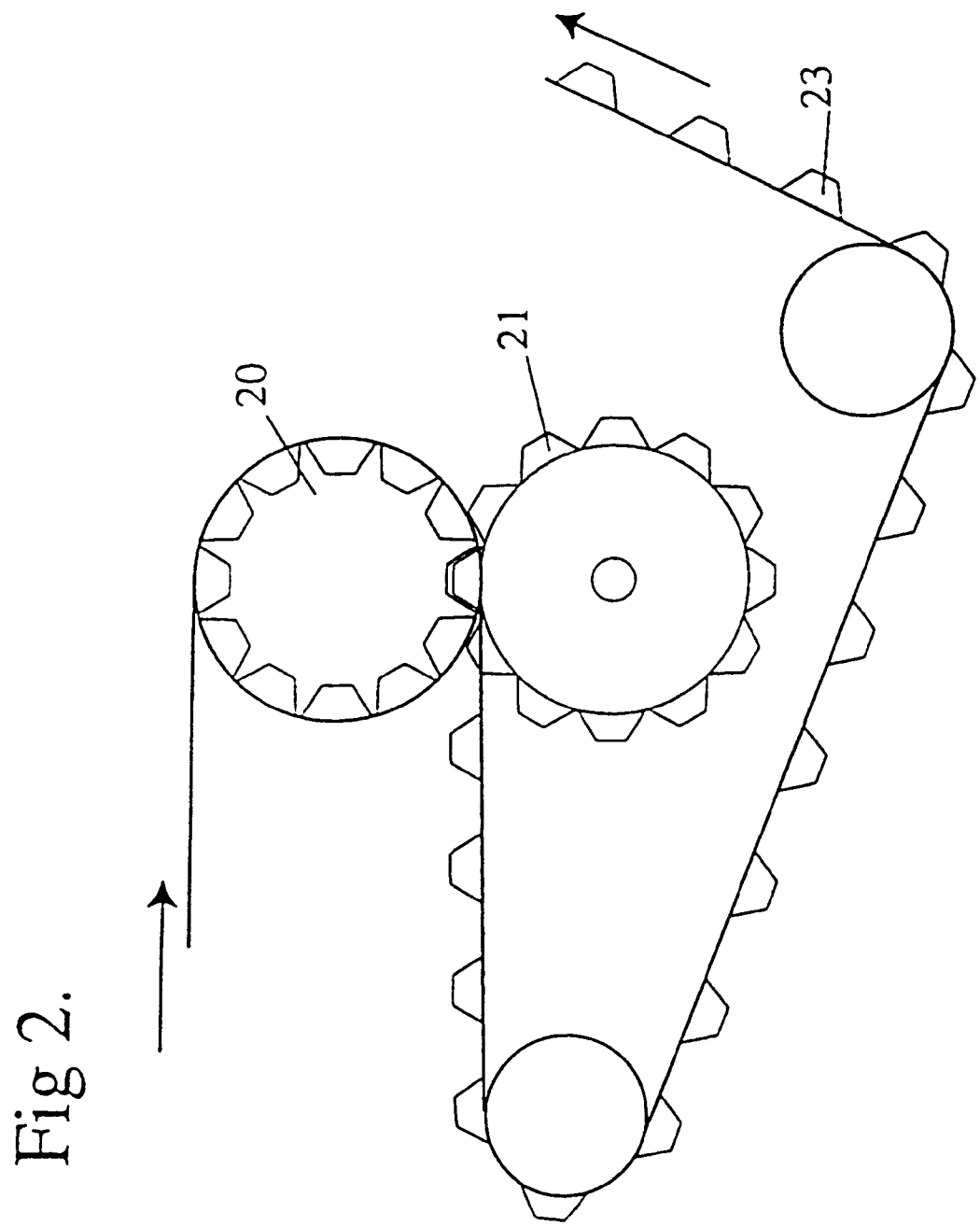
FIG. 2 is a schematic view of dimple rolls in a film stretch line.

FIG. 2 shows schematically an arrangement for forming weakened portions in the film which has been stretched after extrusion, the rolls 20 include dimple portions 21 which impress upon the film to form weakened portions 23 in the already stretched film exiting the stretching machine.

Figure 1:
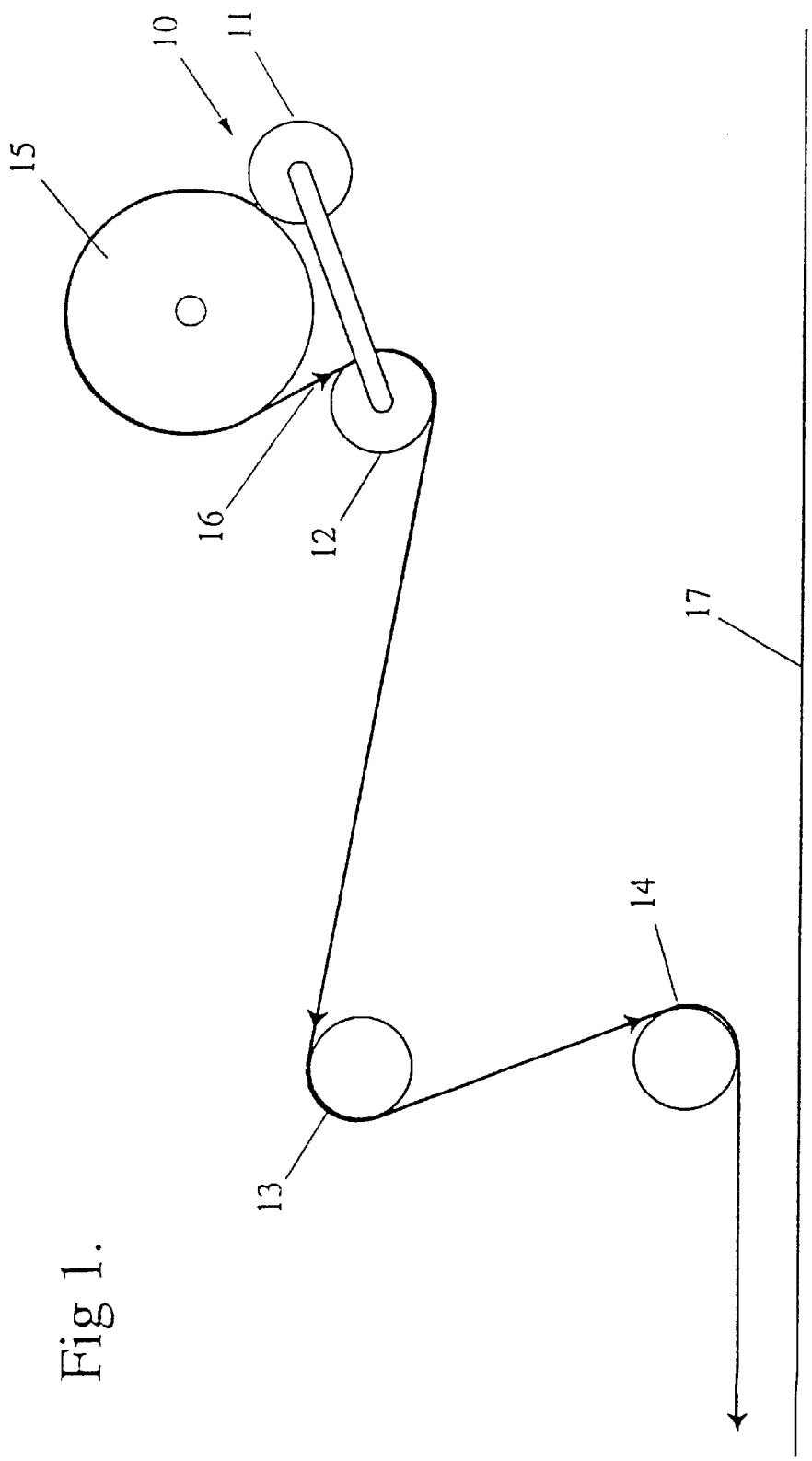
FIG. 1 shows schematically a film stretching machine.
Figure 1A:
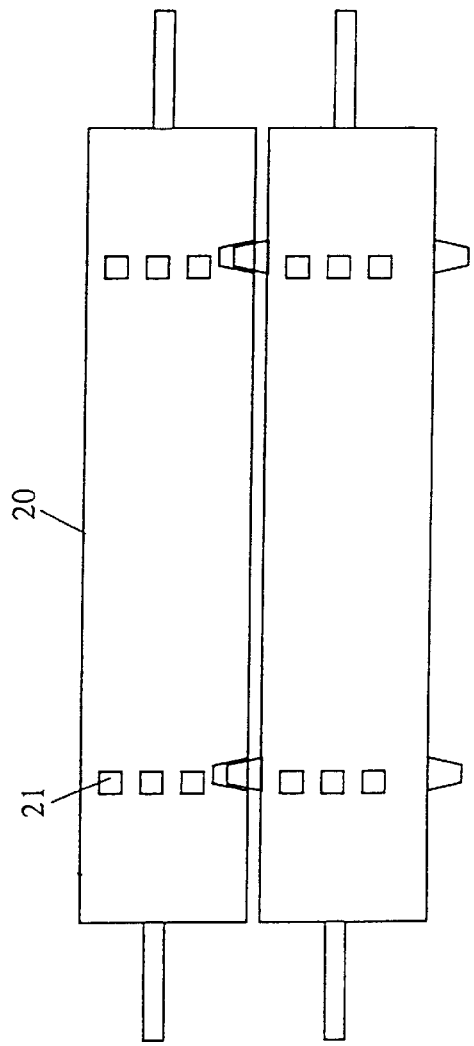
FIGS. 1(a), 1(b), 1(c) and 1(d) show different configurations fo rolls to enable creation of localised stretching of film.
Figure 1B:
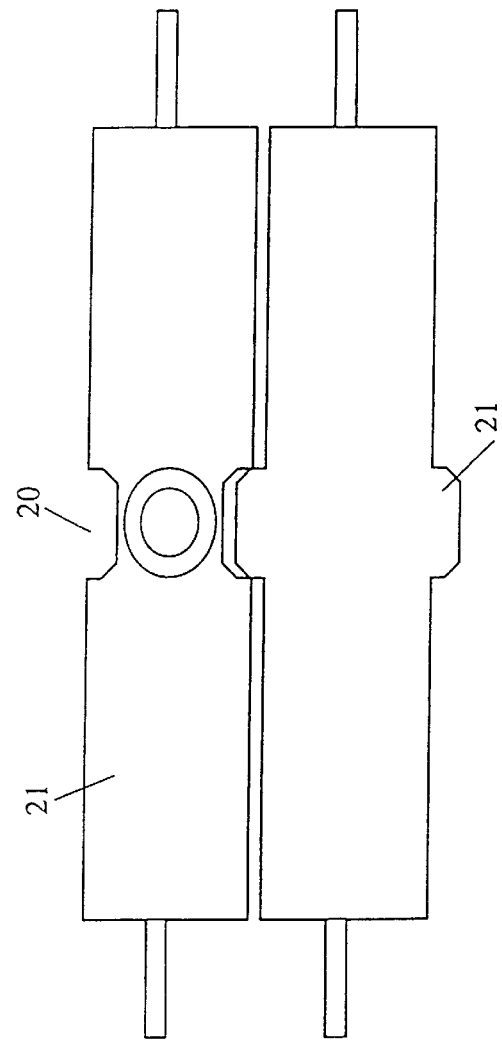

With reference to FIGS. 1(b), (c) and (d) these sketches show rollers having differing surface configurations depending upon the nature of the crop to be covered.

FIG. 1(a) produces film suitable for example, maize where a single stalk will pass through the film at the weakened portion with spacing for two rows of plant.

FIG. 1(b) shows roller 20 with a large area dimple 26 to form a single weakened row which is suitable for example potato crops.

Figure 1C:
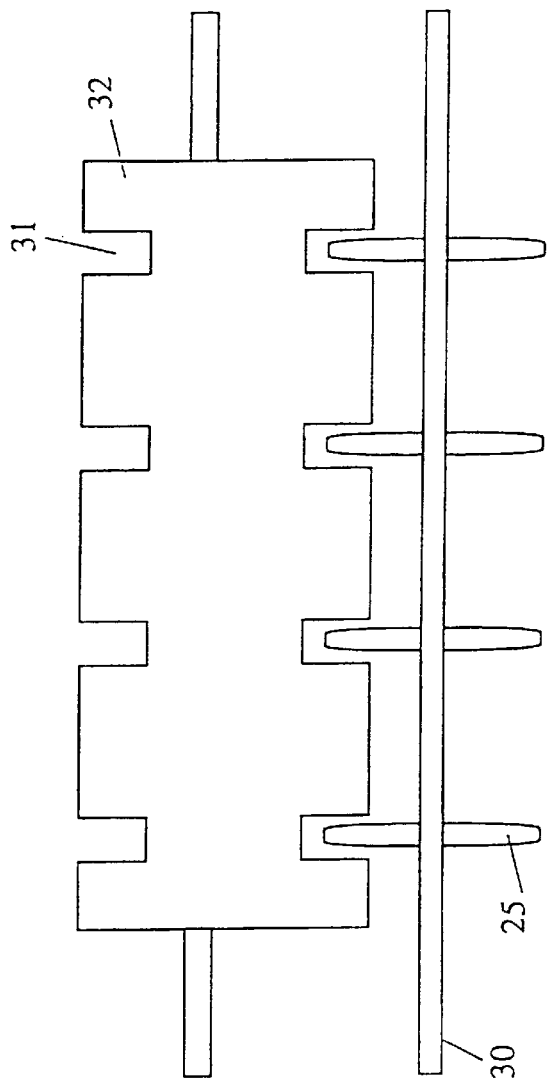

FIG. 1(c) shows four rows of thin long spigots or discs 25 on the roller meshing with apertures or slots 31 on the roller 32 for stretching the film to form very thin localised sections in the film. This has been found suitable for cereal crops such as wheat or barley or the like, or other types of crops.

Figure 1D:
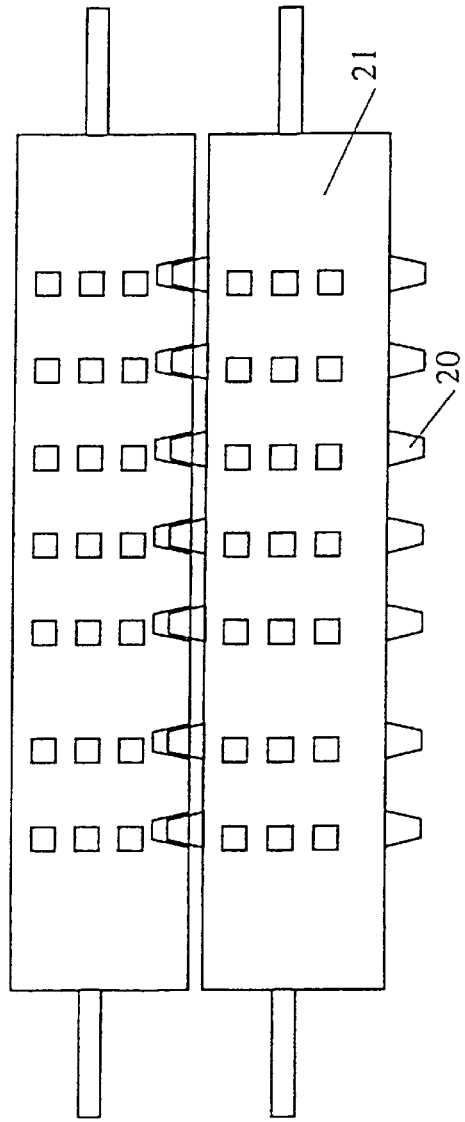

FIG. 1(d) is a further example of rollers configured to form a control pattern of weakness over the stretched film with a pattern of numerous dimples on roller 20, forming multiple rows of weak spots suitable also for cereal crops and other types of crops.

It is preferred to have two stretching stations, the first being for example, an in-line prestretched station at the film extrusion machine in which the embossed rolls illustrated in FIGS. 1(a) to 1(d) are interposed. The embossed rolls being interchangeable to allow a variety of films to be produced at the point of film manufacture.

It has been found that where the film contains colouring opaque pigment, for example, green or black or other colours the localised area of film being additionally stretched by dimples spigots or discs as described above forming this section of film renders the film transparent in those stretched localised sections. As a result the additional beneficial result is obtained whereby light is transmitted into the soil region immediately adjacent the germinating plant bud light is reflected or stopped from penetrating all other areas under the opaque film thereby restricting the growth of weeds and the resultant use of weedicides the like.

The claims defining the invention are as follow:

1. A plastic material film for covering seeded soil or soil destined to contain seeds for propagation, characterised in that the film is a non-ultraviolet resistant photodegradable and/or biologically degradable plastics material film that is stretched at at least localised regions along a length of said film to beyond the yield point of the film to achieve a reduced thickness in said stretched region or regions, the film containing materials to achieve the non-ultraviolet resistant photodegradable and/or biologically degradable capabilities whereby in use the film will deteriorate to allow passage of a germinated seedling therethrough.

2. A plastic material film as claimed in claim 1 characterised in that the film is completely stretched beyond its yield point.

3. A plastics material film as claimed in claim 2 characterised in that the film is completely stretched biaxially.

4. A plastic material film as claimed in claim 1 characterised in that the film is stretched beyond its yield point in a predetermined pattern of said localised regions along a length of said film.

5. A plastic material film as claimed in claim 1 characterised in that the film is stretched beyond its yield point in a predetermined pattern of said localised regions along a length of said film.

6. A plastic material film as claimed in claim 1 characterised in that the film is completely stretched beyond its yield point and is thereafter further stretched along one or more lines along the length of the film.

7. A plastic material film as claimed in claim 1 characterised in that the film is completely stretched beyond its yeild point and is thereafter further stretched in a predetermined pattern of said localised regions along a length of said film.

8. A plastic material film as claimed in claim 1 characterised in that the film in at least said localised region or regions has a thickness of less than 10 microns whereby the film will more quickly deteriorate through weathering and/or biological activity in said stretched region or regions.

9. A plastic material film as claimed in claim 1 characterised in that lateral edges of the film are of greater thickness than a mid portion of the film.

10. A plastic material film as claimed in claim 1 characterised in that lateral edges of the film are folded over.

11. A plastic material film as claimed in claim 1 characterised in that the film is configured as a dual ply film wherein air is trappable therebetween to exhibit good heat insulating properties.

12. A method of growing seedlings or cropping plants germinated in a soil area, said method being characterised in that a plastics material film is stretched at at least localised regions along a length of said film to beyond the yield point of said film to achieve a reduced thickness in said stretched region or regions of said film whereby in use the film will deteriorate to allow passage of a germinated seedling or plant through said stretched region or regions, and said stretched film thereafter being laid over said soil area.

13. A method as claimed in claim 12 characterised in that the film is completely stretched across its transverse width in a longitudinal direction whereby the film length is increased and the film thickness is decreased.

14. A method as claimed in claim 12 characterised in that the film is stretched beyond its yield point along one or more lines along the length of the film.

15. A method as claimed in claim 12 characterised in that the film is stretched beyond its yield point in a predetermined pattern of said localised regions along the length of the film.

16. A method as claimed in claim 12 characterised in that the film is completely stretched beyond its yield point and is thereafter further stretched in a predetermined pattern of said localised regions along a length of said film.

17. A method as claimed in any one of claims 12 characterised in that lateral edges of the film are provided with greater thickness than a mid portion of the film.

18. A method as claimed in claim 12 characterised in that lateral edges of the film are folded over.

19. A method as claimed in claim 12 characterised in that a double layer of said plastics material film is laid over said soil area with an air gap in between said layers to achieve improved insulation performance.

20. A method as claimed in claim 19 characterised in that said plastics material film is formed as a tube to create said double layer, said tube being laid over said soil area.

21. A method as claimed in claim 12 characterised in that said plastics material film facilitates heating of said soil area and protection of said soil area from frost during the seed germination process and/or preceding period.

22. A method as claimed in claim 12 characterised in that the film is completely stretched biaxially to achieve said reduced thickness.

23. A plastics material film for covering seeded soil or soil destined to contain seeds for propagation, characterised in that the film is completely stretched beyond the yield point of the film to achieve a reduced thickness in said stretched film prior to application of the film to the soil and thereafter the film is further stretched in a predetermined pattern along the length of the film to encourage passage of a germinated seedling through said further stretched portions.

24. A plastic material film as claimed in claim 23 further characterised in that said predetermined pattern is chosen according to the type of seedling to be propagated in the soil to be covered.

25. A plastics material film as claimed in claim 23 characterised in that the film includes an opaque pigment with the predetermined pattern forming localised translucent or transparent regions in response to the film being further stretched.

26. A plastics material film as claimed in claim 23 characterised in that the film is further stretched along one or more lines along the length of the film.

27. A plastics material film as claimed in claim 23 characterised in that the film is further stretched in a predetermined pattern of localised regions along the length of said film.

28. A plastics material film as claimed in claim 23 characterised in that said predetermined pattern is chosen according to the type of seedling to be propagated in the soil to be covered.

29. A plastics material film as claimed in claim 23 characterised in that lateral edges of the film are of greater thickness than a mid portion of the film.

30. A plastics material film as claimed in claim 23 characterised in that lateral edges of the film are folded over.

31. A plastics material film as claimed in claim 23 characterised in that the film is configured as a dual ply film wherein air is trappable therebetween to exhibit good heat insulating properties.

32. A plastics material film as claimed in claim 23 characterised in that the film is a non-ultraviolet resistant photodegradable and/or biologically degradable plastics material that is stretched in at least said predetermined pattern to a thickness of less than 10 microns whereby the film will more quickly deteriorate through weathering and/or biological activity in said predetermined pattern.

33. A plastics material film as claimed in claim 23 characterised in that the film is completely stretched biaxially beyond the yield point of the film to achieve said reduced thickness.

34. A plastics material film for covering seeded soil in a first predetermined pattern characterised in that the film is stretched at localised regions in a second predetermined pattern along a length of said film beyond the yield point of the film to achieve a reduced thickness in said localised regions, the second predetermined pattern in use overlying said first predetermined pattern whereby the film will deteriorate at least in said localised regions to allow passage of a germinated seedling therethrough.

35. A plastics material film as claimed in claim 34 characterised in that the second predetermined pattern includes one or more lines extending along the length of said film.

36. A plastics material film as claimed in claim 34 characterised in that the second predetermined pattern includes individual regions spaced apart across and along the length of said film.

37. A plastics material film as claimed in claim 34 characterised in that the film is a non-ultraviolet resistant photodegradable and/or biologically degradable material that is stretched at said localised regions to a thickness less than 10 microns whereby the film will more quickly deteriorate through weathering and/or biological activity in said stretched region or regions.

38. A plastics material film as claimed in claim 34 characterised in that lateral edges of the film are of greater thickness than a mid portion of the film.

39. A plastics material film as claimed in claim 34 characterised in that lateral edges of the film are folded over.

40. A plastics material film as claimed in claim 34 characterised in that the film is configured as a dual ply film wherein air is trappable therebetween to exhibit good insulating properties.

* * * * *

UNITED STATES PATENT AND TRADEMARK OFFICE
CERTIFICATE OF CORRECTION

PATENT NO. : 6,168,840 B1
DATED : January 2, 2001
INVENTOR(S) : Johnstone

Page 1 of 1

It is certified that error appears in the above-identified patent and that said Letters Patent is hereby corrected as shown below:

Column 6,
Lines 33, 44, 49, 53, 57, 61 and 66, "plastic", each occurrence, should read -- plastics --;
Lines 50-51, cancel "in a predetermined pattern of said localised regions";
Line 51, after "along" cancel "a" and insert -- one or more lines along the --;
Line 52, "said" should read -- the --;
Line 63, "yeild" should read -- yield --.

Column 7,
Lines 1, 4, 6 and 61, "plastic", each occurrence, should read -- plastics --;
Line 6, "materical" should read -- material --;
Line 34, "any one of claims 12" should read -- claim 12 --;
Line 37, "claim 12" should read -- claim 17 --.

Signed and Sealed this

Eighteenth Day of December, 2001

Attest:

*Attesting Officer*

JAMES E. ROGAN
*Director of the United States Patent and Trademark Office*